(12) United States Patent
Rumpf et al.

(10) Patent No.: US 7,178,238 B2
(45) Date of Patent: Feb. 20, 2007

(54) METHOD OF PRODUCING A WORKPIECE HAVING AT LEAST ONE BEARING EYE

(75) Inventors: Thomas Rumpf, Gmunden (AT); Elizabeth Schneiderbauer, Taufkirchen (AT); Helmut Spieβberger, Pinsdorf (AT)

(73) Assignee: Miba Gleitlager GmbH, Laakirchen (AT)

( * ) Notice: Subject to any disclaimer, the term of this patent is extended or adjusted under 35 U.S.C. 154(b) by 551 days.

(21) Appl. No.: 10/678,666

(22) Filed: Oct. 3, 2003

(65) Prior Publication Data

US 2004/0064949 A1 Apr. 8, 2004

(30) Foreign Application Priority Data

Oct. 4, 2002 (AT) .............................. A 1504/2002

(51) Int. Cl.
*B21D 53/84* (2006.01)
(52) U.S. Cl. .................. 29/888.09; 29/527.2; 29/527.4
(58) Field of Classification Search ............ 29/888.09, 29/898.042, 898.047, 898.12, 527.2, 527.4; 205/131, 151; 74/579 R; 384/268, 270
See application file for complete search history.

(56) References Cited

U.S. PATENT DOCUMENTS

| | | | | |
|---|---|---|---|---|
| 1,731,790 A | * | 10/1929 | Payne | .................. 29/898.058 |
| 2,048,578 A | * | 7/1936 | Van Der Horst | ............ 205/131 |
| 2,086,841 A | * | 7/1937 | Bagley et al. | ............... 205/137 |
| 2,187,755 A | * | 1/1940 | Ryder | ....................... 29/898.12 |
| 2,929,769 A | * | 3/1960 | Newell et al. | ......... 204/290.08 |
| 3,389,060 A | * | 6/1968 | Greene | ......................... 205/85 |
| 4,096,042 A | * | 6/1978 | Looney et al. | ................ 205/43 |
| 4,931,150 A | * | 6/1990 | Smith | ......................... 205/118 |
| 6,688,273 B2 | * | 2/2004 | Ederer | ..................... 123/197.3 |

FOREIGN PATENT DOCUMENTS

| | | | |
|---|---|---|---|
| DE | 3312905 | * | 10/1984 |
| DE | 19510928 | | 10/1995 |
| DE | 19911339 | * | 9/2000 |
| EP | 0635104 | | 1/1995 |
| EP | 0863322 | | 9/1998 |
| JP | 61-013016 | * | 1/1986 |

\* cited by examiner

*Primary Examiner*—Marc Jimenez
(74) *Attorney, Agent, or Firm*—Collard & Roe, P.C.

(57) ABSTRACT

A method of producing a workpiece (1) having at least one bearing eye (2) is described, the bearing eye (2) being coated with an anti-friction coating (4), which forms a running surface deviating from a circular cylinder. In order to provide advantageous production conditions, it is suggested that the bearing eye (2) be processed for a precise fit to a circular cylinder, before the anti-friction coating (4) is galvanically deposited on the processed bearing eye surface (3) to form the running surface in a varying thickness which corresponds to the final dimensions.

4 Claims, 2 Drawing Sheets

METHOD OF PRODUCING A WORKPIECE HAVING AT LEAST ONE BEARING EYE

FIELD OF THE INVENTION

The present invention relates to a method of producing a workpiece having at least one bearing eye, the bearing eye being coated with an anti-friction coating, which forms a running surface deviating from a circular cylinder.

DESCRIPTION OF THE PRIOR ART

Friction bearings subjected to high dynamic loads, for connecting rods of internal combustion engines, for example, are generally made of bearing shells which are received by a divided bearing seat of the workpiece. In order to avoid the disadvantages in regard to the overall size and therefore the weight, as well as the production cost, connected with providing separate bearing shells, it has already been suggested that the bearing eye provided in the workpiece be coated directly with an anti-friction material (European Patent Application 0 635 104 B1). For this purpose, the workpiece may be coated with the anti-friction coating through a thermal spray method, before the anti-friction coating applied to the bearing eye surface is divided together with the workpiece or, if the workpiece is already divided, is itself divided corresponding to the workpiece by a fracture separation. As an additional advantage of this direct coating of the bearing eye, it was emphasized that the bearing eye surface to be coated must no longer be reprocessed for a precise fit, because imprecisions are compensated for by applying the anti-friction coating and it is therefore no longer necessary to appropriately process the anti-friction coating itself precisely. However, the compensation of imprecisions of the bearing eye requires sufficiently thick anti-friction coatings, which thermal spray methods are particularly suitable for applying. Such thermal spray methods have the disadvantage, however, that the adhesion between the anti-friction coating sprayed on and the bearing eye surface is not sufficient for high load requirements without something further. In addition, due to the compensation of imprecisions, after the anti-friction coating has been processed for a precise fit, a non-uniform thickness of the anti-friction coating, whose distribution is unpredictable, must be expected. In many applications, a non-uniform thickness of the anti-friction coating around the circumference and/or over the axial length of a friction bearing is sought to form a shape of the running surface formed by the anti-friction coating which deviates from a circular cylinder, in order to be able to avoid, for example, impairment of the lubricant film formation in the partition line region between the parts of a divided bearing eye or excessive edge pressure in the axial end region of the bearing, but for this purpose, costly reprocessing of the anti-friction coating applied to the bearing eye surface is necessary.

SUMMARY OF THE INVENTION

The present invention is therefore based on the object of implementing a method of producing a workpiece forming at least one bearing eye of the type initially described in such a way that with a comparatively low production cost, high dynamic bearing load capacity may be ensured, as well as an advantageous service life.

This object is achieved according to the present invention in that the bearing eye is processed to a circular cylinder for a precise fit before the anti-friction coating is galvanically deposited onto the processed bearing eye surface to form the running surface in a varying thickness which corresponds to the final dimensions.

Since the bearing eye is processed for a precise fit to a circular cylinder before being coated, the final dimensions of the running surface formed by the anti-friction coating may be achieved through precise control of the application thickness of the anti-friction coating onto the processed bearing eye surface, without having to reprocess the running surface. The galvanic deposition of the anti-friction coating onto the processed bearing eye surface offers an advantageous possibility of applying the anti-friction coating onto the bearing eye surface using different depositing rates, because only a corresponding distribution of the electrical field over the bearing eye surface between an anode provided in the bearing eye and the material connected as a cathode must be ensured for this purpose. The depositing rate rises in the region of greater field strengths, so that if the depositing conditions are otherwise identical, the thickness gradient of the anti-friction coating deposited onto the bearing eye surface may be controlled very precisely via the field distribution. Therefore, for example, with a divided bearing eye, the release of the running surface often required in the region of the partition line may be achieved through a depositing rate for the anti-friction coating which is lower in the partition line region, with a comparatively thin anti-friction coating as a requirement for a high fatigue strength.

During the coating of a workpiece having a divided bearing eye, the bearing eye surface is processed for a precise fit after the divided bearing eye is assembled and then galvanically coated with the anti-friction coating before the anti-friction coating is divided by a fracture separation in accordance with the division of the bearing eye. Since the processing for a precise fit of the bearing eye surface is performed after the divided bearing eye is assembled, in order to provide the requirements for a tailored coating which ensures the final dimensions without reprocessing, after the anti-friction coating is applied in a thin layer, it must only be ensured that the anti-friction coating applied is divided in accordance with the division of the bearing eye, which is advantageously performed through a fracture separation. The comparatively low coating thickness and the good adhesion of the galvanically deposited anti-friction coating on the bearing eye surface represent advantageous conditions for fracture separation without problems.

To produce workpieces according to the present invention having at least one bearing eye, on whose circular cylindrical bearing eye surface an anti-friction coating is deposited which forms a running surface deviating from a circular cylinder, it is possible to start from a typical device, which includes a device for galvanic deposition of the anti-friction coating on the bearing eye surface in an electrical field between the workpiece, which is connected as the cathode, and an anode coaxial to the bearing eye. To achieve a distribution of the electrical field over the bearing eye surface corresponding to the varying deposition rate required, the anode may have a shape deviating from a circular cylinder, having smaller radii in the depositing region of smaller coating thicknesses, so that in the region of the smaller coating thicknesses, there is a greater distance between the anode and the cathode surface formed by the circular cylindrical bearing eye surface. A comparable effect in regard to the field distribution over the bearing eye surface may be achieved if screens for the electrical field are provided in the annular gap between the bearing eye surface to be coated and the anode in the depositing region of smaller coating thicknesses.

BRIEF DESCRIPTION OF THE DRAWING

The method according to the present invention for producing a workpiece having at least one bearing eye will be described in greater detail on the basis of the drawing.

DESCRIPTION OF THE PREFERRED EMBODIMENTS

Figures 1, 2:
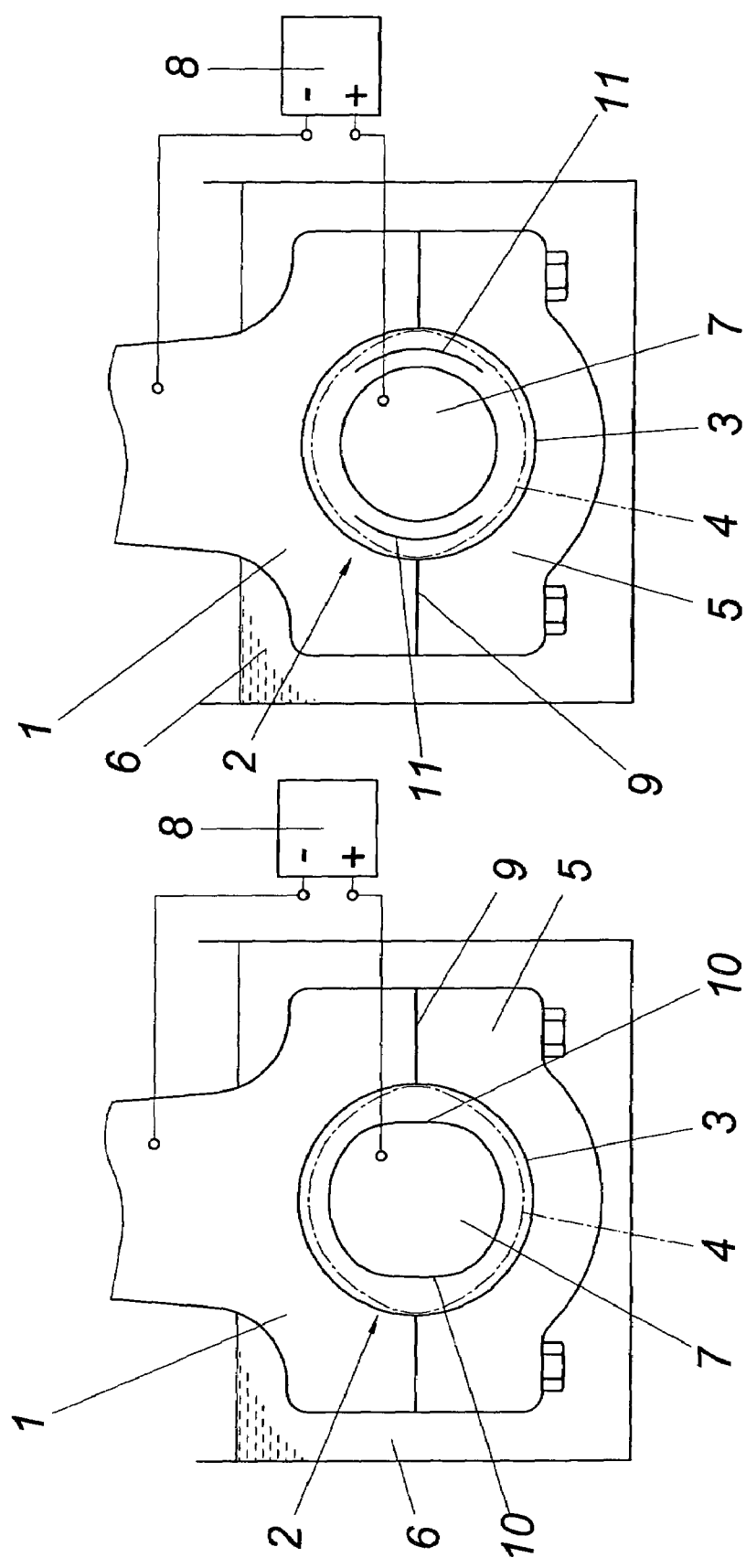
FIG. 1 shows a device according to the present invention for coating the bearing eye of a workpiece with an anti-friction coating in a schematic block diagram.
FIG. 2 shows an embodiment of a coating device altered in relation to FIG. 1.

In order to be able to coat a workpiece 1 having a bearing eye 2, such as a connecting rod, with an anti-friction coating 4 in the region of the bearing eye surface 3 in such a way that the running surface resulting from the anti-friction coating 4 does not require any reprocessing, the surface 3 of the bearing eye 2 is first processed for a precise fit to a circular cylinder. For a divided bearing eye 2, as is shown in the drawing, this means that upon a preferred fracture separation of the workpiece, the bearing eye 2 is first divided along an intended fracture point before the separated bearing cover 5 is attached again to process the bearing eye surface 3 in order to be able to compensate for deformations of the workpiece 1 during the fracture separation due to brittleness occurring in the region of the intended fracture point. After the processing of the running surface 3 for a precise fit corresponding to a circular cylinder, the workpiece 1 is prepared in a typical way for galvanic coating of the running surface 3 with an anti-friction coating 4 and is introduced into a galvanic device 6, whose anode is indicated with 7. The workpiece 1, which is connected as the cathode, forms a cathode surface with the processed bearing eye surface 3, between which and the anode 7 an electrical field builds up as soon as the workpiece 1 and the anode 7 are connected to an appropriate DC network 8. The strength of the electrical field and therefore the current density, which is decisive for the depositing rate, is a function of the distance between the anode 7 and the bearing eye surface 3, if other conditions remain the same. Therefore, if the friction bearing to be produced is to have exposure of the running surface formed by the anti-friction coating 4 in the region of the partition line 9 between the bearing cover 5 and the remaining workpiece 1, as shown in FIG. 1, a larger distance between the bearing eye surface 3 and the anode 7 is to be ensured, which therefore has a flattened area 10 in relation to a circular cylindrical shape in the region of the partition line 9. The distribution of the depositing rate around the circumference of the bearing eye 2 may thus be influenced through the shape of the cross-section of the anode 7 perpendicular to the axis of the bearing eye 2. Because of the lower depositing rate in the region of the partition line 9, a corresponding exposure of the running surface results as a consequence of the lower thickness of the deposited anti-friction coating 4 in comparison to the remaining peripheral regions. With the tailored coating of the bearing eye surface 3, which is processed for a precise fit, possible through the galvanic deposition, a running surface which deviates from the circular cylindrical shape may be produced easily without complex mechanical reprocessing. The anti-friction coating 4 deposited continuously around the circumference of the bearing eye 2 may be divided by a simple fracture separation along the partition line 9 due to the low coating thickness and the good adhesion to the bearing eye surface 3.

In FIG. 2, a coating of the bearing eye 2 corresponding to that in FIG. 1, having exposure of the running surface in the region of the partition line 9, is sought. However, in contrast to FIG. 1, the field distribution, which differs around the circumference of the bearing eye 2, is not achieved via a changing distance between the anode 7, which is positioned coaxially to the bearing eye 2, and the bearing eye surface 3, but rather through appropriate shielding of the anode 7 in relation to the bearing eye surface 3. For this purpose, electrically non-conductive screens 11 made of plastic, for example, are provided in the region of the partition line 9 between the circular cylindrical anode 7 and the circular cylindrical bearing eye surface 3, which ensure weakening of the field in their region and therefore reduction of the depositing rate.

Figure 4:
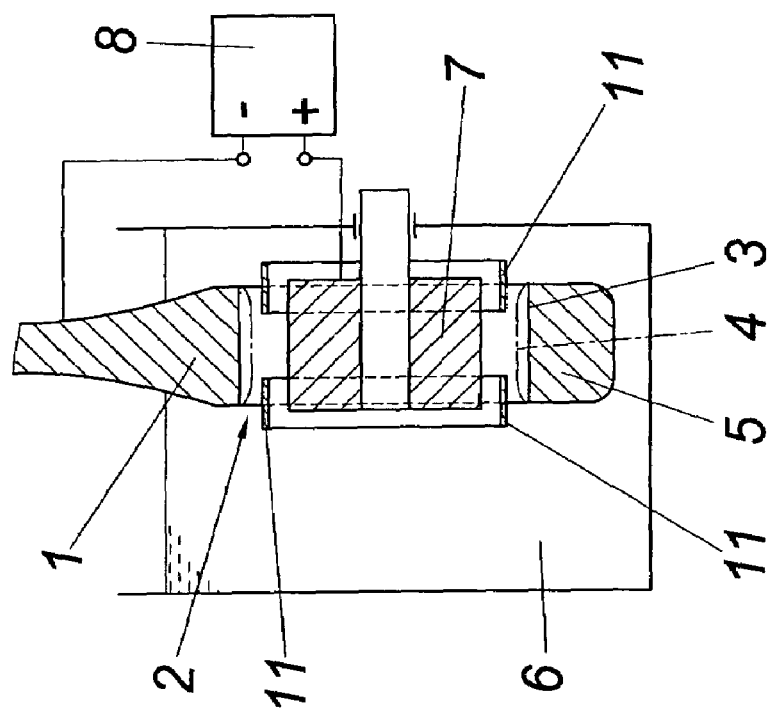
FIG. 4 shows a construction variant of a coating device altered in relation to FIG. 3.
Figure 3:
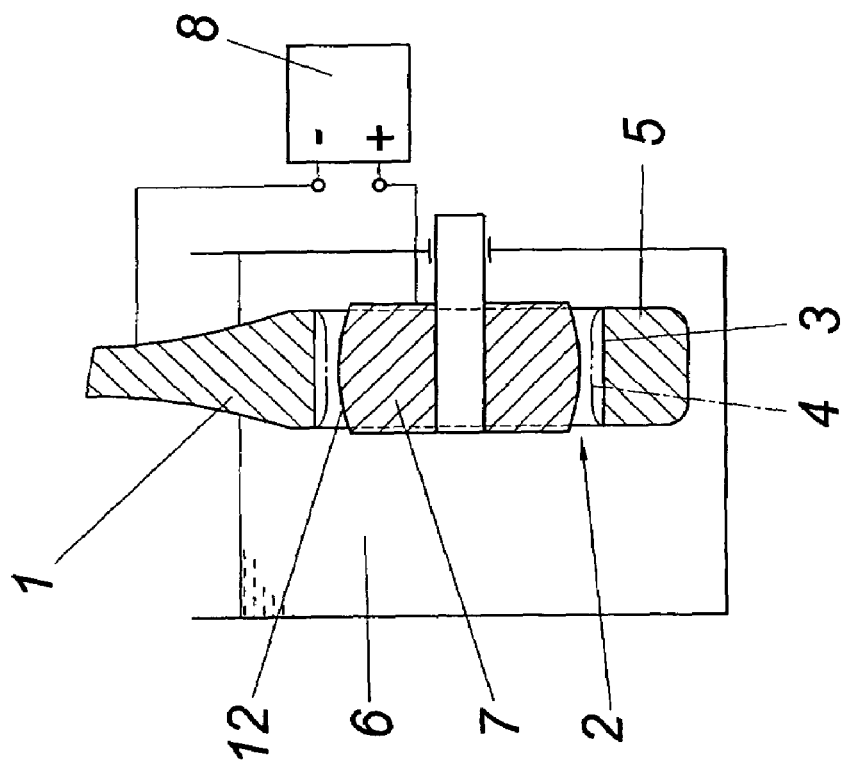
FIG. 3 shows a further embodiment of a device according to the present invention for coating a bearing eye in a schematic block diagram.

The coating procedure for the workpiece 1 shown in FIGS. 3 and 4 corresponds to that shown in FIGS. 1 and 2, however, the bearing eye 2 is to obtain a running surface which is crowned in longitudinal section to avoid edge pressures. For this purpose, the depositing rate for the anti-friction coating is to be reduced in the region of the axial end sections of the bearing eye surface 3 in relation to the middle axial section. As shown in FIG. 3, this is achieved by an anode 7 which has a convex peripheral surface 12, so that because of the radii of the anode 7, which become smaller toward the axial faces, the distance between the peripheral surface 12 and the circular cylindrical bearing eye surface 3 correspondingly increases, which provides the desired distribution of the depositing rate over the axial length of the bearing eye 2. The weakening of the electrical field toward the axial faces of the bearing eye 2 may also be achieved through screens 11, as is indicated in FIG. 4.

It probably does not have to be especially emphasized that an anti-friction coating may be implemented in many ways without mechanical reprocessing of the running surface through mere galvanic deposition, so that the present invention is in no way restricted by the exemplary embodiments shown.

What is claimed is:

1. A method of producing a workpiece having at least one bearing eye, the bearing eye surface being coated with an anti-friction coating which forms a running surface deviating from a circular cylinder, characterized in that the bearing eye surface is processed for a precise fit to a circular cylinder before the anti-friction coating is galvanically deposited onto the processed bearing eye surface to form the running surface in a varying thickness corresponding to the final dimensions.

2. The method according to claim 1, characterized in that for a workpiece having a divided bearing eye, the bearing eye surface is processed for a precise fit after the divided bearing eye is assembled and is then galvanically coated with the anti-friction coating, before the running surface is divided in accordance with the division of the bearing eye through a fracture separation.

3. A device for producing a workpiece having at least one bearing eye, which has a circular cylindrical bearing eye surface, onto which an anti-friction coating is deposited, forming a running surface deviating from a circular cylinder, comprising: a device for galvanic deposition of the anti-friction coating onto the bearing eye surface in an electrical field between the workpiece, which is connected as the cathode, and an anode, which is coaxial to the bearing eye, characterized in that the anode has a shape deviating from a circular cylinder, having smaller radii in the depositing region of lower coating thicknesses.

4. A device for producing a workpiece having at least one bearing eye, which has a circular cylindrical bearing eye surface, onto which an anti-friction coating is deposited, forming a running surface deviating from a circular cylinder, comprising: a device for galvanic deposition of the anti-friction coating onto the bearing eye surface in an electrical field between the workpiece, which is connected as the cathode, the device comprising an anode, which is coaxial to the bearing eye, and in the annular gap between the bearing eye surface to be coated and the anode, screens for the electrical field located in the depositing region of lower coating thicknesses.

* * * * *